United States Patent [19]

Cole

[11] Patent Number: 4,689,489

[45] Date of Patent: Aug. 25, 1987

[54] TANK GAUGE SYSTEM

[75] Inventor: John B. Cole, Chester, United Kingdom

[73] Assignee: Shell Oil Company, Houston, Tex.

[21] Appl. No.: 914,548

[22] Filed: Oct. 1, 1986

Related U.S. Application Data

[63] Continuation of Ser. No. 522,132, Aug. 11, 1983, abandoned.

[30] Foreign Application Priority Data

Aug. 26, 1982 [GB] United Kingdom ............... 8224564

[51] Int. Cl.$^4$ ............................................. G01N 21/86
[52] U.S. Cl. .................................... 250/560; 250/577; 356/5
[58] Field of Search ................... 250/560, 577; 356/4, 356/5

[56] References Cited

U.S. PATENT DOCUMENTS

| | | | |
|---|---|---|---|
| 3,649,123 | 3/1972 | Ulicki | 356/5 |
| 3,900,260 | 8/1975 | Wendt | 356/5 |
| 4,210,023 | 7/1980 | Sacamoto et al. | 73/290 R |
| 4,236,819 | 12/1980 | Green | 356/5 |
| 4,274,736 | 6/1981 | Balmer | 356/5 |
| 4,297,030 | 10/1981 | Chaborski | 356/5 |
| 4,359,902 | 11/1982 | Lawless | 73/290 R |
| 4,458,530 | 7/1984 | Bastida | 73/290 R |
| 4,498,764 | 2/1985 | Bolkow | 356/5 |

FOREIGN PATENT DOCUMENTS

83/03135 9/1983 PCT Int'l Appl. .

Primary Examiner—David C. Nelms

[57] ABSTRACT

A method and apparatus are provided for measuring the level of a surface of a material in a tank. The apparatus and method modulate an optical radiation beam at a radio frequency. The radiation beam is transmitted to the surface and the reflected beam received. The modulation frequency is changed until the phase of the received beam is the same as that from an optical reference path. The optical reference path is any fixed length path that allows the beam to pass from the source of the beam to the receiver that receives the reflected beam. An optical switch determines whether the receiver receives the reflected beam or the reference beam. The change in modulation frequency may then be correlated with the level on the material's surface in the tank.

11 Claims, 1 Drawing Figure

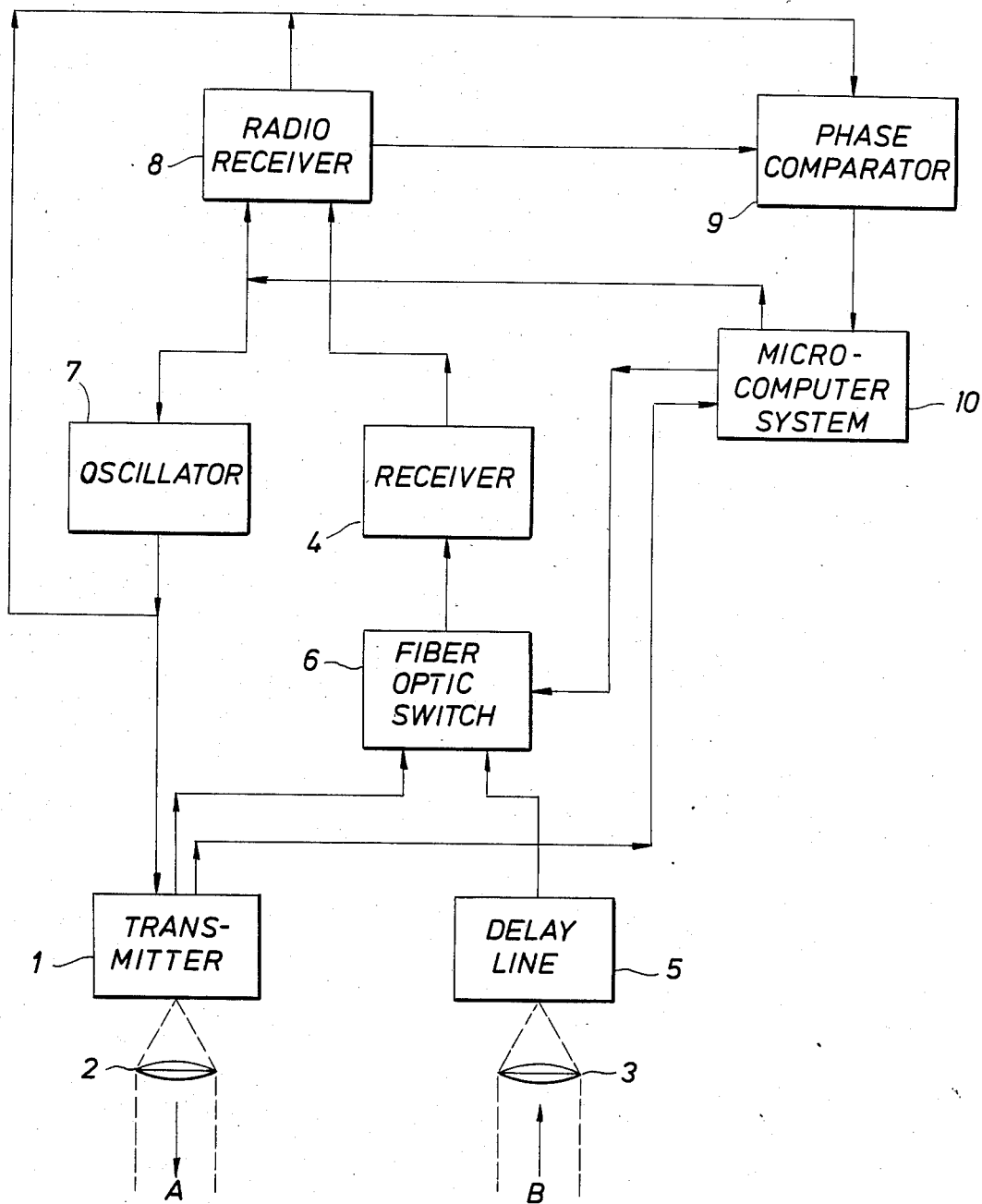

TANK GAUGE SYSTEM

This is a continuation of application Ser. No. 522,132, filed Aug. 11, 1983, now abandoned.

BACKGROUND OF THE INVENTION

The invention relates to a method and apparatus for measuring the position of an interface between different materials in a storage tank or vessel.

There are many devices which are presently available for measuring the interface positions between two or more different materials. Such devices may, for example, be used for determining the level of a material (for example liquid) present in a (storage) vessel or container. Various techniques are known to provide such level or interface position measurements. An example of such a known technique is the use of microwaves. According to this known technique high-frequency electro-magnetic waves are directed toward the liquid level in the tank, where they are reflected from the liquid surface. The propagation time in the gas above the liquid gives a level-indication. This technique is virtually independent of the gas and the nature of the liquid, but it is rather costly. Further, undesirable spurious reflections from the vessel walls often create detection problems. Further, optical rangefinders exist which employ one or more discrete frequencies and measure the phase of the modulation of the reflected light. However, measuring phases and phase differences may provide technical difficulties and a good accuracy is not always obtained.

It is therefore an object of the invention to provide a method and apparatus for measuring the level of a material or the position of an interface between different materials, which is accurate and cheap and provides results, which are not affected by changes in the physical properties of the liquid.

It is another object of the invention to provide a method and apparatus for determining the level in a tank, involving radio frequency phase measurement, which is capable of using electrical power levels consistent with intrinsically safe operation.

SUMMARY OF THE INVENTION

The invention therefore provides a method for determining the level of the surface of a material in a storage tank or vessel comprising the steps of modulating electrically an optical radiation beam by a radio frequency f, continuously variable over a suitable range, transmitting the beam to the surface of the material, receiving the beam reflected from the surface, adjusting the frequency in order to obtain phase equality of the modulation in the measurement path in which the beam has travelled to the surface and the modulation in a reference path in which the beam has not travelled to the surface and deriving from this adjustment information as to the level in the tank or vessel.

The invention further provides an apparatus for determining the level of the surface of a material in a storage tank or vessel comprising means for modulating electrically an optical radiation beam by a radio frequency f, continuously variable over a suitable range, means for transmitting the beam to the surface of the material, means for receiving the beam reflected from the surface, means for adjusting the frequency in order to obtain phase equality of the modulation in the measurement path in which the beam has travelled to the surface and the modulation in a reference path, in which the beam has not travelled to the surface and means for deriving from this adjustment information as to the level in the tank or vessel.

As already indicated, the present invention is based upon the modulation (in particular amplitude modulation) of an optical beam such as a laser by a continuous variable frequency and to adjust it to obtain phase equality of the modulation in an optical measurement path and a reference path.

Other objectives, advantages and applications of the present invention will be made apparent by the following detailed description of the preferred embodiments of the present invention.

BRIEF DESCRIPTION OF THE DRAWINGS

The FIGURE is a diagrammatic view of a gauge system according to the present invention.

DETAILED DESCRIPTION OF THE PREFERRED EMBODIMENTS

With reference to the Figure, a suitable optical transmitter 1, such as, for example, a laser diode, is installed in the roof of a tank (not shown for reasons of clarity) to transmit a radiation-beam "A" through a lens 2 to the liquid surface in the tank (not shown).

Further, a receiver 4 is installed in order to receive the radiation "B" reflected from the liquid surface through a lens 3. The receiver 4 may, for example, consist of a PIN photodiode which receives the light reflected through an optical fiber used as a delay line 5 and through a fiber optic switch 6.

The laser is electrically modulated by a radio frequency oscillator 7 at frequency f, variable over a suitable range. The light is transmitted to the liquid surface and reflected from the liquid surface. The reflected light is focused onto the optical fiber used as a delay line 5, and conducted thereby to the PIN photodiode 4 in order to obtain a signal representative for the reflected light. By means of the fiber optic switch 6 the photodiode by means of a second position of the switch can also view a light signal from the laser that has not travelled to the liquid surface (the reference path). The intensity of these two light signals is now arranged in any suitable way to be roughly equal. The output of the photodiode 4 is taken to what is in effect a superheterodyne radio receiver 8, tuned to frequency f. The radio receiver has not been shown in detail, since such devices are known to those skilled in the art. The output of the frequency oscillator 7 is also connected through suitable devices such as, for example, a mixer (not shown) and a suitable amplifier (not shown) to a phase comparator 9, which is connected in any suitable way to a small microcomputer system 10 (not shown in detail). The oscillator frequency, the tuning of the receiver, and the position of the fiber optic switch are all controlled by the small microcomputer system 10 running a program to determine the tank level. This may, for example, be carried out as follows: Initially f is set to the maximum value of its range, then reduced under program control to search for the highest frequency ($f_1$) at which the phase of the received signal is the same for either position of the fiber optic switch. Once $f_1$ has been measured the same process is repeated to determine $f_2$, the second highest frequency for which the same condition holds. At both $f_1$ and $f_2$ the modulation of the light reaching the fiber optic switch is the same for both optical paths.

Let 1 be the distance from the transmitter-receiver unit to the liquid surface, and let $l_o$ be the product of the difference in fiber length between the two paths and the refractive index of the fiber. Additional phase lags are introduced into both paths by the common fiber length, the finite response time of the photodiode and the electrical delay associated with the finite bandwidth of the receiver. Let their total magnitude be $\phi$ [f], where [ ] denotes functional dependence. Unlike $l_o$, which is extremely stable, $\phi$[f] is sensitive to changes of temperature and supply voltage.

At frequency $f_1$ the phase equality requires:

$$\frac{2\pi f_1}{c}(2l + l_o) + \phi[f_1] = 2n\pi + \phi[f_1] \quad (1)$$

in which c is the velocity of light and n is a positive integer. Similarly, at $f_2$:

$$\frac{2\pi f_2}{c}(2l + l_o) + \phi[f_2] = 2(n-1)\pi + \phi[f_2] \quad (2)$$

From (1) and (2) n can be determined:

$$n = \frac{f_1}{f_1 - f_2} \quad (3)$$

and can be rounded to an exact integer value. Then the tank level can be determined from $$1 = \frac{1}{2}\left(\frac{nc}{f_1} - l_o\right) \quad (4)$$

The measurement sequence and the subsequent claculation are repeated by the microprocessor several times per second.

It will be appreciated that the frequencies $f_1$ and $f_2$ are not necessarily the highest frequencies, although the higher frequencies in general give the better accuracy. However, for a given liquid level there exists an infinite set of frequencies which satisfy the condition of phase equality, equally separated in frequency. The level can be calculated unambiguously from a knowledge of any two adjacent frequencies of this set, or of any two nonadjacent frequencies provided the number of intermediates is known. Thus the selection of $f_1$ and $f_2$ as the highest and next highest frequencies falling within the range of the variable frequency oscillator is marginally the best choice, but not the only possible choice for a usable system. Thus it will be clear that the invention is not restricted to the choice of the highest frequencies.

It will be appreciated that any light source and modulation suitable for the purpose may be used. It will also be appreciated that any frequency range suitable for the purpose may be used. Generally, the V.H.F. region of the spectrum is used. In an advantageous embodiment of the invention a practically operating frequency of about 85–200 MHz is used. The maximum permissible distance from the transmitter-receiver to the liquid surface is set by the signal to noise ratio of the optical system.

Various modifications of the invention will become apparent to those skilled in the art from the foregoing description and accompanying drawing. Such modifications are intended to fall within the scope of the appended claims.

What is claimed is:

1. A method of determining the level of a material in a tank, said method comprising the steps of: providing an optical radiation beam and a means for modulating said beam, modulating electrically an optical radiation beam by a radio frequency f, continuously variable over the radio frequency range; transmitting said beam to the surface of the material; receiving the beam reflected from said surface; adjusting the modulation frequency in order to obtain phase equality between the modulation in the path in which the beam has travelled to and from the surface and the modulation in a path in which the beam has travelled a preselected fixed distance and generating information indicative of the change in frequency to obtain phase equality; and deriving from the change in frequency information the level in the tank.

2. A method as recited in claim 1, further comprising the steps of: setting the frequency f initially to the maximum value of its range; reducing frequency f to search for the highest frequency at which said phase equality is the same; and repeating said setting and reducing steps to determine a second highest frequency $f_2$ at which said phase equality is the same.

3. A method as recited in claim 1, wherein the optical radiation beam is a laser beam.

4. A method as recited in claim 2, wherein the optical radiation beam is a laser beam.

5. A method as recited in claim 2, wherein said setting, reducing and repeating steps comprise the step of controlling the frequency by means of a microcomputer system.

6. A method as recited in claim 4, wherein said setting, reducing and repeating steps comprise the step of controlling the frequency by means of a microcomputer system.

7. An apparatus for determining the level of the surface of a material in a tank, said apparatus comprising: means for generting an optical radiation beam; means for modulating electrically an optical radiation beam by a radio frequency f, continuously variable over the radio frequency range; means for transmitting said beam to the surface of the material; means for receiving the beam reflected from said surface; means for adjusting the frequency in order to obtain phase equality of the modulation in the path in which the beam has travelled to and from said surface and the modulation in a path in which the beam has travelled a preselected fixed distance and for generating information indicative of the change in frequency to obtain phase equality; and means for deriving from said change in frequency information the level in the tank.

8. An apparatus as recited in claim 7, further comprising: means for setting the frequency f initially to the maximum value of its range; means for reducing the frequency f to search for the highest frequency at which the phase equality is the same in either a first or second position of a switch means wherein said first position operatively interconnects said receiving means to said path in which said beam has travelled to said surface and said second position operatively interconnects said receiving means to said fixed path; and means for determining a second highest frequency $f_2$ at which the phase equality is the same for either of said positions of said switch means.

9. An apparatus as recited in claim 8, wherein said switch means comprises a fiber optic switch.

10. An apparatus as recited in claim 7, wherein said modulating means comprises a variable frequency oscillator having a frequency range of at least 85–200 MHz.

11. An apparatus as recited in claim 9, wherein said modulating means comprises a variable frequency oscillator having a frequency range of at least 85–200 MHz.

* * * * *